(12) United States Patent
Wengrovitz

(10) Patent No.: US 8,397,989 B2
(45) Date of Patent: Mar. 19, 2013

(54) METHOD AND APPARATUS FOR USING BOARDING PASSES TO APPLY BUSINESS RULES

(75) Inventor: Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 295 days.

(21) Appl. No.: 12/791,086

(22) Filed: Jun. 1, 2010

(65) Prior Publication Data
US 2011/0290875 A1 Dec. 1, 2011

(51) Int. Cl.
G07B 15/02 (2011.01)
(52) U.S. Cl. ...................................... 235/384
(58) Field of Classification Search .................. 235/375, 235/382, 383, 384, 462.01
See application file for complete search history.

(56) References Cited

U.S. PATENT DOCUMENTS

| | | | |
|---|---|---|---|
| 6,735,575 B1 | 5/2004 | Kara | |
| 7,275,689 B2 | 10/2007 | Mak | |
| 7,546,254 B2 * | 6/2009 | Bednarek | 705/26.1 |
| 8,027,873 B2 * | 9/2011 | Drefs et al. | 705/14.27 |
| 2004/0035928 A1 | 2/2004 | Anderson | |
| 2006/0111973 A1 | 5/2006 | Brown et al. | |

* cited by examiner

*Primary Examiner* — Seung Lee
(74) *Attorney, Agent, or Firm* — Wall & Tong, LLP

(57) ABSTRACT

A capability is provided for using boarding passes to apply business rules for travelers. The information encoded in a region of a boarding pass of a traveler is read or otherwise accessed. The information from the encoded region of the boarding pass is propagated toward a system configured for determining whether to apply a business rule for the traveler. The system receives the information from the encoded region of a boarding pass of the traveler, and determines whether to apply a business rule for the traveler using at least a portion of the information from the encoded region of the boarding pass. The system, upon identifying a business rule to apply for the traveler, initiates a process for applying the business rule for the traveler. A business rule may indicate that an account of the traveler is to be credited or debited. A business rule may indicate that the traveler is entitled to remuneration, such as money, coupons, vouchers, discounts, offers, loyalty points, and the like.

23 Claims, 5 Drawing Sheets

METHOD AND APPARATUS FOR USING BOARDING PASSES TO APPLY BUSINESS RULES

FIELD OF THE INVENTION

The invention relates generally to travel and, more specifically but not exclusively, to use of boarding passes as e-currency within transportation terminals.

BACKGROUND

Airline boarding passes are used by travelers to gain access to the secured regions of airport terminals prior to aircraft boarding. In a process familiar to travelers, a boarding pass is obtained prior to entering the secured region of an airport terminal. Typically, a traveler receives a boarding pass after presenting suitable identification and confirming his/her flight reservation information during a flight check-in process at an airport ticket counter or kiosk. Recently, airlines also have begun distributing boarding passes to travelers electronically, such as when a traveler makes flight reservations online, and checks in for the flight and print out his/her boarding pass before arriving at the airport. Some airlines are now distributing boarding passes directly to smartphones of travelers.

When a traveler passes through the security portal separating the unsecured and secured regions of an airport terminal, a security agent carefully checks to ensure that the traveler is carrying a valid boarding pass. The security agent typically validates the name of the traveler on the boarding pass, e.g., by comparing the name against a valid form of identification having a photograph, such as a driver's license or passport of the traveler. The security agent also typically confirms that the boarding pass is valid for that particular date and place, and a traveler having a boarding pass for a flight on different date or from a different airport is not permitted to pass through the security portal. Additionally, boarding passes are now required to include two-dimensional (2D) barcodes, which automate, simplify, and streamline the flight boarding process, thereby preventing long queues while ensuring that each traveler is boarding the correct flight.

As a result, every person within the secured region of an airport must possess a valid boarding pass. Thus, disadvantageously, while every person is required to carry a boarding pass in order to gain access to the secured region of the airport and to board the flight, the boarding pass is only used for these purposes.

SUMMARY

Various embodiments for using boarding passes to apply business rules are depicted and described herein. The information encoded in a region of a boarding pass of a traveler is read or otherwise accessed. The information from the encoded region of the boarding pass is propagated toward a system configured for determining whether to apply a business rule for the traveler. The system receives the information from the encoded region of a boarding pass of the traveler, and determines whether to apply a business rule for the traveler using at least a portion of the information from the encoded region of the boarding pass. The system, upon identifying a business rule to apply for the traveler, initiates a process for applying the business rule for the traveler. A business rule may indicate that an account of the traveler is to be credited or debited. A business rule may indicate that the traveler is entitled to remuneration, such as money, coupons, vouchers, discounts, offers, loyalty points, and the like.

BRIEF DESCRIPTION OF THE DRAWINGS

The various embodiments discussed herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A capability is provided for extending the typical usage of a boarding pass, which is currently used by a traveler only to access a secured region of an airport and to board an airplane. The current usage of the boarding pass is extended such that the boarding pass may be used for functions other than accessing a secured region of an airport and boarding an airplane. The capability enables the boarding pass of a traveler to be used to access and apply one or more business rules for the traveler. The capability enables use of a boarding pass as e-currency, both within the unsecured and secured regions of the airport. The capability enables linking of a boarding pass of a traveler to a stored value account (SVA) associated with the traveler, which then can be credited and/or debited as determined by various business rules. Although primarily depicted and described herein within the context of a boarding pass of an airport, it will be appreciated that the capability may be utilized with any suitable tickets and passes for any other suitable types of transportation (e.g., by travelers at train stations, bus stations, and the like).

Figure 1:
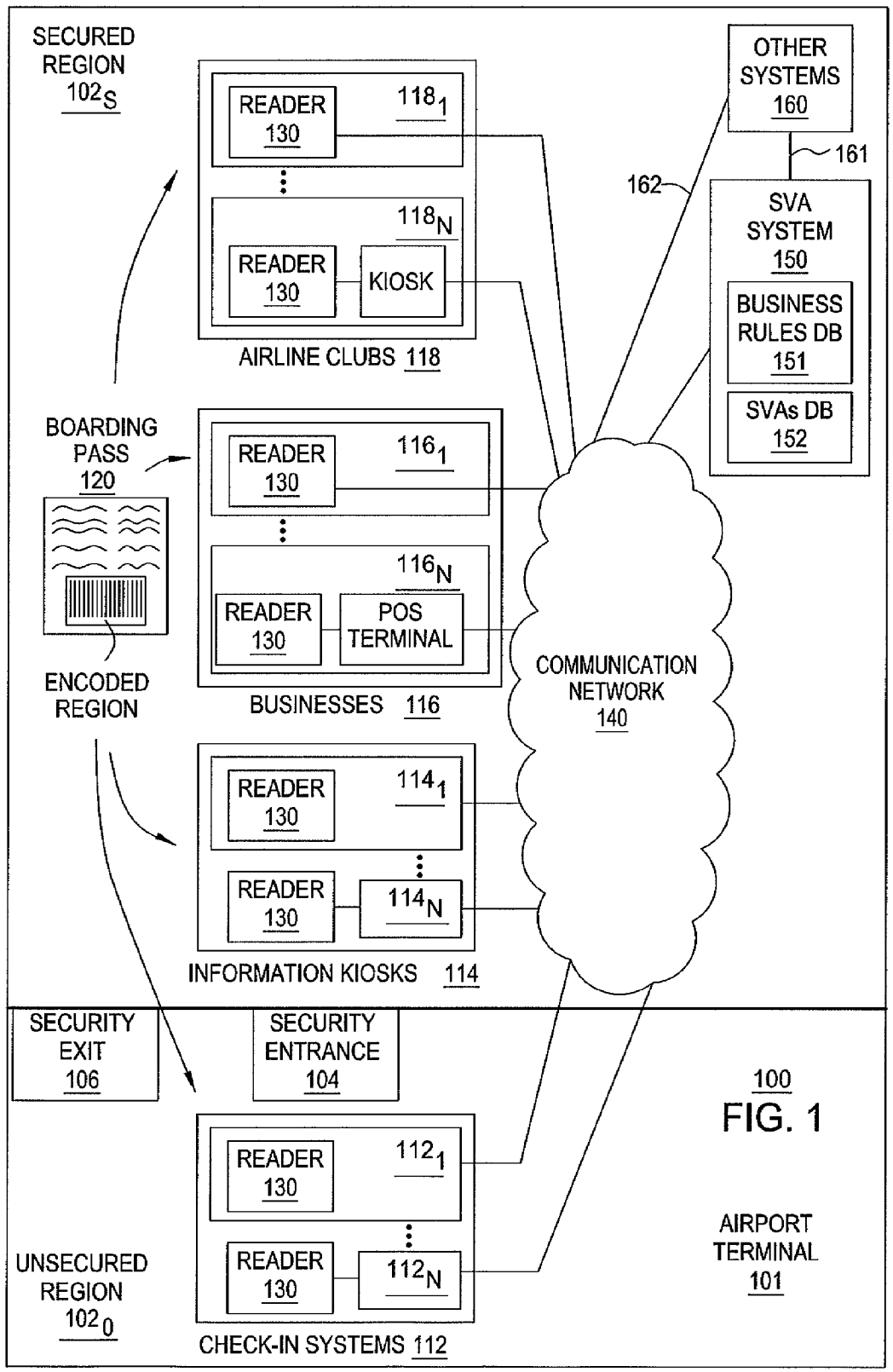
FIG. 1 depicts a high-level block diagram of an exemplary airport terminal environment.

FIG. 1 depicts a high-level block diagram of an exemplary airport terminal environment.

As depicted in FIG. 1, the airport terminal environment 100 includes various elements which may be used in providing the capability for extending the use of boarding passes, including but not limited to a boarding pass (BP) 120, barcode readers 130, and a Stored Value Account (SVA) System 150.

The airport terminal environment 100 includes an airport terminal 101 having an unsecured region $102_U$ and a secured region $102_S$.

The unsecured region $102_U$ of airport terminal 101 includes a plurality of check-in systems $112_1$-$112_N$ (collectively, check-in systems 112). The check-in systems 112 may include all systems by which a traveler may check-in for a flight and received his/her boarding pass for the flight. For example, check-in systems 112 may include curbside check-in systems operated by airport and/or airline staff, indoor check-in systems operated by airport and/or airline staff, check-in kiosks via which travelers may check themselves in, and the like, as well as combinations thereof. The types of check-in systems available in an unsecured region of an airport will be understood. Similarly, the typical operation of check-in systems available in an unsecured region of an airport will be understood.

The secured region $102_S$ of airport terminal 101 includes a plurality of information kiosks $114_1$-$114_N$ (collectively, information kiosks 114), a plurality of businesses $116_1$-$116_N$ (collectively, businesses 116), and a plurality of airline clubs $118_1$-$118_N$ (collectively, airline clubs 118). Although depicted as being grouped together, it will be appreciated that the information kiosks 114, businesses 116, and airline clubs 118 may be situated within the airport terminal 101 in any suitable arrangement.

The information kiosks 114 may include any kiosks via which a traveler may perform travel-related functions and/or access travel-related information (e.g., check in for a flight and printing a boarding pass, change his/her seat on a flight, print an electronic ticket receipt, and the like, as well as combinations thereof). The types of information kiosks available in a secured region of an airport will be understood. Similarly, typical operation information kiosks in a secured region of an airport will be understood.

The businesses 116 may include any types of businesses which may be operating in the secure region of an airport. For example, businesses 116 may include retail stores, restaurants, and the like.

The airline clubs 118 may include any types of airline clubs which may be available in the secure region of an airport. The airline clubs 118 may include additional information kiosks (e.g., in addition to information kiosks 114).

A person may pass from unsecured region $102_U$ to secured region $102_U$ via a security entrance 104. When a person passes from unsecured region $102_U$ to secured region $102_U$ via a security entrance 104, a number of validations and checks are performed. For example, the person typically must present a valid boarding pass and associated identification information (e.g., a driver's license, a passport, or any other suitable form of identification), the person typically must pass through a metal detector and/or other type(s) of scanners. The typical manner in which a person passes from an unsecured region of an airport to a secured region of an airport will be understood.

A person may pass from secured region $102_S$ to unsecured region $102_U$ via a security exit 106. The typically manner in which a person passes from a secured region of an airport to an unsecured region of an airport will be understood.

A person in the unsecured region $102_U$ may have a valid boarding and a person in the secured region $102_S$ must have a valid boarding pass.

An exemplary boarding pass (BP) 120 is depicted in FIG. 1.

The BP 120 may be a paper boarding pass (e.g., printed by the traveler before arriving to the airport, printed by the traveler at the airport, printed by the airline at a ticket counter in the airport, and the like) or an electronic boarding pass (e.g., stored within a smartphone or other suitable device of the traveler).

The BP 120 typically includes information such as traveler information (e.g., name, address, and the like), flight information (e.g., date, time, name of the airline, originating and terminating locations, flight number, gate number, a verifiable reservation record-locator, and the like), and other information. The BP 120 also may include various other types of information (e.g., frequent flier status), as will be understood. This information may be referred to herein as BP information.

The BP 120 also includes an encoded region in which some or all of the BP information is encoded. The encoded region of the BP 120 is capable of being read by an associated reader.

In one embodiment, as depicted in FIG. 1, the encoded region of the BP 120 is a two-dimensional (2D) barcode. The 2D barcode may use any suitable barcode format. For example, the International Air Transport Association (IATA) now mandates that all BPs include a 2D barcode including the traveler name, the date, the originating and terminating locations, the name of the airline, the flight number, and, optionally, other information such as a reservation record-locator or ticket number. In one embodiment, the 2D barcode also may include a hashed digital signature suitable for use in validating the authenticity of the BP. The 2D barcode of the BP 120 is capable of being easily and reliably read by any suitable barcode reader.

The BP 120 of a traveler, using the encoded BP information from the encoded region of the BP, may be used to access and apply business rules for the traveler, which may include any suitable business rule(s) as described herein. It will be appreciated that, due to the heightened security policies and measures in airports around the world, a traveler typically does not use a BP other than his/her own, present an invalid BP or BP other than his/her own, or alter the information on his/her BP, without risking legal consequences. Accordingly, a BP carried by a traveler is likely to be the BP of that traveler and, thus, the encoded BP information from the encoded region of the BP may be used to access and apply business rules for the traveler.

As depicted in FIG. 1, barcode readers 130 are available for use within unsecured region $102_U$ and secured region $102_S$. It will be appreciated that not all of the check-in systems 112, information kiosks 114, businesses 116, and/or airline clubs 118 will necessarily have a barcode reader 130 available therein (although this could be the case). Similarly, it will be appreciated that at least some of check-in systems 112, information kiosks 114, businesses 116, and/or airline clubs 118 may have multiple barcode readers 130 available therein.

The barcode readers 130 are configured for reading the 2D barcodes of boarding passes (e.g., illustratively, BP 120).

In one embodiment, a barcode reader 130 is a standalone barcode reader that is not integrated with or communicating with any other systems or devices such as check-in systems 112, information kiosks 114, point-of-sale terminals of businesses 116, or information kiosks of airline clubs 118. In this embodiment, standalone barcode reader 130 is configured for communicating with the SVA System 150 directly. A standalone barcode reader 130 may communicate with SVA System 150 in any suitable manner, e.g., via a wireline connection, via a wireless connection (e.g., WiFi, cellular, and the like), and the like, as well as various combinations thereof.

In one embodiment, a standalone barcode reader 130 may include a user control interface via which a user can control the standalone barcode reader 130. For example, the user control interface may be used for initiating a transaction with the SVA System 150, for entering additional information (to supplement the barcode information) for use by the SVA System 150 in accessing and applying business rules, and the like, as well as various combinations thereof.

In one embodiment, a standalone barcode reader 130 may include a display interface via which information may be presented to a user of the standalone barcode reader 130. For example, the display interface may be used for presenting information determined from scanning the 2D barcode of BP 120, for presenting results received from SVA System 150 (e.g., results from business rules applied by SVA System 150), and the like, as well as various combinations thereof.

In one embodiment, a standalone barcode reader 130 may include a combination of a user control interface and a display interface.

In such embodiments, the user control and/or display interfaces of the standalone barcode readers 130 may be designed in any suitable manner, as will be understood by one skilled in the art.

In one embodiment, a barcode reader 130 is an integrated barcode reader that is loosely or tightly integrated with one or more systems or devices, such as with check-in systems 112, information kiosks 114, point-of-sale terminals of businesses 116, and/or information kiosks of airline clubs 118.

In one embodiment, for example, an integrated barcode reader 130 may be a separate reader that is capable of communicating with the system or device. For example, an integrated barcode reader 130 may be a separate reader that plugs into a system or device or otherwise supports wired communications with the system or device (e.g., similar to credit/debit card devices typically associated with point-of-sale terminals). For example, an integrated barcode reader 130 may be a separate reader that is capable of communicating with the system or device wirelessly.

In one embodiment, for example, an integrated barcode reader 130 may be integrated with a system or device by forming part of that system or device. For example, a check-in system may include a capability for reading the encoded region of the 2D barcode of a BP. For example, an information kiosk may include an image capture capability via which it may read the 2D barcode of a BP.

An integrated barcode reader 130 may be implemented in any other suitable manner, as will be understood by one skilled in the art.

In one embodiment, an integrated barcode reader 130 may communicate with SVA System 150 via the system or device with which the integrated barcode reader 130 is associated. In this embodiment, the integrated barcode reader 130 may communicate with the system or device in any suitable manner (e.g., using a wired connection, a wireless connection, and the like). Similarly, in this embodiment, the system or device with which the integrated barcode reader 130 is associated may communicate with SVA System 150 in any suitable manner, e.g., via a wireline connection, via a wireless connection (e.g., WiFi, cellular, and the like), and the like, as well as various combinations thereof. In such embodiments, the integrated barcode reader 130 also may be capable of communicating with the SVA System 150 directly (e.g., in a manner similar to communication between standalone barcode readers 130 and SVA System 150 as described hereinabove).

In one embodiment, an integrated barcode reader 130 may communicate with the SVA System 150 directly, in a manner similar to communication between standalone barcode readers 130 and SVA System 150 as described hereinabove. In this embodiment, the integrated barcode reader 130 may communicate with SVA System 150 in any suitable manner (e.g., using a wired connection, a wireless connection, and the like). In such embodiments, an integrated barcode reader 130 may facilitate communication between a device or system with which the integrated barcode reader 130 is integrated (e.g., a check-in system 112, an information kiosk 114, a point-of-sale terminal of a business, and the like) and the SVA System 150.

In such embodiments, an integrated barcode reader 130 may or may not include user control and/or display interfaces as described with respect to standalone barcode readers 130. In one embodiment, in which a system or device with which an integrated barcode reader 130 is associated has user control and display interfaces (e.g., a check-in system 112 having user controls and a computer monitor for display, an information kiosk having a user control interface and associated display, a point-of-sale terminal having a user control interface and associated display, and the like), the integrated barcode reader 130 may have its own user control and/or display interfaces (e.g., which may be used in conjunction with the user control and/or display interfaces of the associated system or device) or may not have its own user control and/or display interfaces (e.g., where one or both of such interfaces are unnecessary given the user control and associated display interfaces of the system or device with which the integrated barcode reader 130 is associated). In one embodiment, in which a system or device with which an integrated barcode reader 130 is associated does not have user control and display interfaces, the integrated barcode reader 130 may include its own user control and/or display interfaces (although communication with SVA System 150 still may be provided via the system or device with which the integrated barcode reader 130 is associated).

It will be appreciated that combinations of such barcode readers 130 (namely, standalone and integrated) may be utilized within airport terminal 101.

As described herein, and as will be appreciated in view of the foregoing descriptions of various embodiments of standalone and integrated barcode readers 130, each barcode reader 130 may have available at least one communication path via which the barcode reader 130 may communicate with SVA System 150 for purposes of exchanging information related to various capabilities depicted and described herein.

The communication paths between barcode readers 130 and the SVA System 150 may be supported using any suitable communication capabilities. In one embodiment, for example, a communication network 140 supports communications between the barcode readers 130 and SVA System 150. The barcode readers 130 may access communication network 140 directly or indirectly (e.g., via the systems or devices with which the barcode readers 130 are associated). The communication network 140 may be any suitable network. For example, the communication network 140 may support wireline and/or wireless communications capabilities. For example, communication network 140 may be a network that is dedicated for handling communication related to reading of BPs and application of business rules based on reading of BPs, an existing network typically handling existing communications within airport terminal 101 (e.g., one or more of (1) communications between existing airport systems such as check-in systems, security systems, and the like, (2) communications associated with providing WiFi access within airport terminal 101, and the like, as well as various combinations thereof), and the like. The communication network 140 may utilize any suitable communications technologies (e.g., network types, protocols, and the like). Although primarily depicted and described with respect to use of communication network 140 to support communications between barcode readers 130 and SVA System 150, it will be appreciated that communication paths between barcode readers 130 and SVA System 150 may be supported in any suitable manner.

The SVA System 150 is configured to extend the use of BP 120 of a traveler by receiving messages resulting from reading of the encoded region of BP 120 by barcode readers 130, and processing the received messages for applying one or more business rules for the traveler.

The SVA System 150 may be located at airport terminal 101 or remote from airport terminal 101. In the illustrative embodiment of FIG. 1, the SVA System 150 is located within airport terminal 101.

The SVA System 150 may communicate with barcode readers 130 in any suitable manner, which may include using existing communication infrastructure of airport terminal 101 and/or new communication infrastructure of airport terminal 101. This also or alternatively may include using other communication infrastructure (e.g., via one or more other networks, such as where SVA System 150 is located remote from airport terminal 101). In the illustrative embodiment of FIG. 1, SVA System 150 communicates with barcode readers 130 using the communication network 140 of airport terminal 101.

The SVA System 150 has access to information suitable for use by SVA System 150 in determining which business rules to apply for travelers and applying business rules for travelers.

In one embodiment, SVA System 150 maintains a database of business rules available for application for travelers (illustratively, business rules database 151). The business rules database 151 may be internal to or external from SVA System 150. In the case of an external database, the SVA System 150 may have a direct connection to the external database or the SVA System 150 may access the database via a network (e.g., such as communication network 140). In the illustrative embodiment of FIG. 1, business rules database 151 is internal to SVA System 150. The business rules database 151 may store the business rules in any suitable format. The business rules that may be stored within business rules database 151 of SVA System 150 are described in additional detail within the context of business rule processing performed by SVA System 150.

In one embodiment, SVA System 150 maintains a database of stored value accounts (SVAs) for travelers (illustratively, SVAs database 152). The SVAs database 152 maintains SVAs of travelers, which may be accessed and updated based on application of business rules stored in business rules database 151. The SVAs database 152 may be internal to or external from SVA System 150. In the case of an external database, the SVA System 150 may have a direct connection to the external database or the SVA System 150 may access the database via a network (e.g., such as communication network 140). In the illustrative embodiment of FIG. 1, SVAs database 151 is internal to SVA System 150. The SVAs database 151 may maintain the SVAs in any suitable format. The SVA maintained within SVAs database 151 for a traveler may include any suitable information for that traveler, e.g., personal information of the traveler, value associated with the account of the traveler (e.g., e-currency, e-coupons, e-vouchers, e-discounts, e-offers, loyalty points, and the like), transaction history information of the traveler (e.g., which may be used for determining which business rules to evaluate for the traveler, which may be used for evaluating one or more business rules for the traveler, which may specify one or more additional transaction-based business rules for the traveler, and the like, and so on), and the like, as well as various combinations thereof. The use of SVAs of SVA database 152 is described in additional detail within the context of business rule processing performed by SVA System 150.

Although primarily depicted and described herein as two standalone databases, it will be appreciated that business rules database 151 and SVA database 152 may be maintained in any other suitable manner (e.g., using a single common database, where one or both are implemented using multiple databases, and the like, as well as various combinations thereof).

In one embodiment, SVA System 150 may interact with one or more other systems (denoted as other systems 160) for one or more of determining which business rules to evaluate, determining which business rules to apply, and/or applying one or more business rules.

In one embodiment, for example, the other systems 160 may include airport systems, which may include any systems operated by the airport, such as check-in systems 112, kiosks 114, and the like. For example, SVA System 150 may interact with check-in systems 112 and/or kiosks 114 for use in receiving information (e.g., for use in determining which business rules to evaluate, determining which business rules to apply, and the like) and/or for use in providing information (e.g., for providing indications of credits available to travelers, for providing e-rewards which may be printed and provided to travelers, and the like).

In one embodiment, for example, the other systems 160 may include airline systems, such as flight status systems from which SVA System 160 may determine flight status information for use in determining whether or not to apply particular business rules (e.g., remunerating a traveler when his/her flight is delayed by more than a threshold length of time, remunerating a traveler when a flight is cancelled, and the like), loyalty program tracking systems which the SVA System 160 may access for directly crediting travelers with loyalty program points or debiting loyalty program points from travelers wishing to conduct transactions within the airport using loyalty program points (e.g., to pay stores, restaurants, and the like), and the like, as well as various combinations thereof.

In one embodiment, for example, the other systems 160 may include systems of the businesses 116. For example, SVA System 150 may interact with one or more of inventory systems of the businesses 116 (e.g., for determining types of items available from the businesses 116 for determining types of rewards that may be provided to the traveler at particular businesses 116), payment systems of the businesses 116 (e.g., for enabling credits to be applied to the bill of the traveler automatically by SVA System 150), and the like, as well as various combinations thereof.

The other systems 160 may include any other systems with which SVA System 150 may interact for one or more of determining which business rules to evaluate, determining which business rules to apply, and/or applying one or more business rules.

The SVA System 150 may communicate with the other systems 160 using any suitable communication capabilities. In one embodiment, for example, SVA System 150 may communicate with at least some of the other systems 160 directly (as depicted by communication path 161. In one embodiment, for example, the communication network 140 may be used to support communication between SVA System 150 and at least some of other systems 160 (as depicted by communication path 162).

As described herein, the SVA System 150 communicates with various other devices for extending the use of BP 120 of a traveler (e.g., barcode readers 130, other systems 160, and the like). In one embodiment, at least a portion of the communications of SVA System 150 may be provided using various secure communications capabilities, which may be implemented in any suitable manner. The use of secure communications for exchanging information will ensure the safety of the information, much of which may include sensitive information such as information read from the encoded region of BP 120, traveler account information, and the like, as well as various combinations thereof.

The SVA System 150 is configured to extend the use of BP 120 of a traveler by receiving messages resulting from reading or accessing of the encoded region of BP 120, and processing the received messages for applying one or more business rules for the traveler. A description of various embodiments of this process follows.

The SVA System 150 receives a message indicative that the encoded region of BP 120 has been read (e.g., by a barcode reader 130) or accessed (e.g., by a smartphone of the traveler). This message may be denoted herein as a request message, in that the message may be considered to be a request for the SVA System 150 to perform a business rules process for enabling the SVA System 150 to apply one or more business rules for the traveler. In one embodiment, the business rules process performed by SVA System 150 in response to the request message is configured to enable the SVA System 150 to identify business rules to be evaluated, evaluate the identified business rules for determining whether to apply any business rules, and apply any applicable business rules for the traveler (e.g., those business rules for which the evaluation indicates that the requirements of the business rules are satisfied such that results of those business rules may be applied for the traveler).

The request message includes information suitable for use by the SVA System 150 in applying one or more business rules for the traveler associated with the BP 120. The request message includes at least a portion of the BP information from the encoded region of the BP 120.

The request message also may include additional information that is not included within the encoded region of BP 120, but which may be useful in determining which business rules to apply and/or applying business rules.

In one embodiment, for example, the additional information includes information identifying a device and/or location at which BP 120 is read. The additional device and/or location information may include one or more of an indication of a type of device from which the encoded information of BP 120 is read or accessed (e.g., barcode reader, kiosk, smartphone, and the like), an identifier of the device from which the encoded information of BP 120 is read or accessed (e.g., barcode reader 1, kiosk 8, and the like), an indication of a type of device or system associated with the device from which the encoded information of BP 120 is read or accessed (e.g., a check-in system, a kiosk, a point-of-sale terminal, and the like), an identifier of a device or system associated with the device from which the encoded information of BP 120 is read or accessed (e.g., check-in system 14, point-of-sale terminal 123, and the like), an identifier of a type of location at which the encoded information of BP 120 is read or accessed (e.g., store, restaurant, airline club, and the like), an identifier of a location at which the encoded information of BP 120 is read or accessed (e.g., the specific check-in counter at which BP 120 is read, the specific business 116 at which BP 120 is read, the specific airline club 118 at which BP 120 is read, and the like), and the like.

In one embodiment, for example, the additional information includes travel-related information. For example, additional travel-related information may include one or more of a check-in time, a weight of baggage checked by the traveler, and the like, as well as various combinations thereof, This type of information may be provided, for example, where the BP 120 is read from a check-in system 112, information kiosk 114, and the like. The additional travel-related information may include any other suitable types of information.

In one embodiment, for example, the additional information includes transaction-related information. The additional transaction-related information may include one or more of a type of transaction being performed, types of items being purchased, the cost of each item being purchased, the total cost of the items being purchased, and the like, as well as various combinations thereof. This type of information may be provided, for example, where the BP 120 is read from a barcode reader 130 or other suitable device associated with one of the businesses 116, one of the airline clubs 118, and the like. The additional transaction-related information may include any other suitable types of information.

The additional information may include any other suitable types of information.

The additional information may include various combinations of such embodiments, e.g., one or more of information identifying a device and/or location at which the boarding pass is read, travel-related information, transaction-related information, and the like.

The SVA System 150, based on a request message, identifies one or more business rules to be evaluated for the traveler.

As described herein, the business rules may be specified in any suitable manner. In general, a business rule may include (1) one or more input conditions which are evaluated, based on input information, in order to determine whether or not the business rule is applicable and (2) one or more output results which specify the action(s) to be taken upon a determination that the input conditions are satisfied (i.e., upon a determination that the business rule should be applied).

The manner in which SVA System 150 determines which business rules to evaluate may depend on one or more factors.

In one embodiment, for example, the manner in which SVA System 150 determines which business rules to evaluate, for a message indicative that the encoded region of BP 120 has been read by a barcode reader 130, may depend on the manner in which the business rules are organized and maintained within SVA System 150. In one embodiment, for example, at least some business rules may be maintained on a per-traveler basis, such that those business rules associated with the traveler identified in the received message can be evaluated for the traveler. In one embodiment, for example, at least some business rules may be maintained on a per-airline basis, such that those business rules associated with the airline on which the traveler is scheduled to fly can be evaluated for the traveler. In one embodiment, for example, at least some business rules may be maintained on a per-airport-location basis, such that those business rules associated with the location (e.g., check-in systems 112, kiosks 114, businesses 116, and airline clubs 118) can be evaluated for the traveler. In one embodiment, for example, business rules may be maintained without being categorized, such that all business rules of SVA System 150 are potentially evaluated for the traveler. It will be appreciated that SVA System 150 may maintain business rules using various combinations of such embodiment and/or various other embodiments.

In one embodiment, for example, the manner in which SVA System 150 determines which business rules to evaluate, for a message indicative that the encoded region of BP 120 has been read by a barcode reader 130, may depend on the information received in the message indicative that the encoded region of BP 120 has been read by a barcode reader 130.

For example, when the message includes only the information read from the encoded region of the BP 120, SVA System 150 may evaluate any business rules which may be related to the information received as part of the message (which may include evaluating rules based on individual data elements included within the message and/or based on combinations of data elements included within the message).

For example, when the message includes additional information, in addition to the information read from the encoded region of the BP 120, SVA System 150 may evaluate any business rules related to any of the data elements included within the message, or may evaluate any business rules which may be related only to both the information received as part of the message and the additional information. As described herein, the additional information may include information such as device and/or location information, travel-related information, transaction-related information, and the like, as well as various combinations thereof.

The manner in which SVA System 150 determines which business rules to evaluate may depend on the information in the received message in any other suitable manner.

In one embodiment, for example, the manner in which SVA System 150 determines which business rules to evaluate, for a message indicative that the encoded region of BP 120 has been read by a barcode reader 130, may depend on supplemental information determined based on information received within the message indicative that the encoded region of BP 120 has been read by a barcode reader 130. The supplemental information may include any suitable information obtained from any suitable source. For example, the supplemental information may include flight status information for the flight on which the traveler is scheduled (e.g., determined by SVA System 150 from a flight status system based on the airline name and flight number received as part of the message), stored value account information for the traveler (e.g., current balance(s) of the traveler as determined by SVA System 150 from stored value accounts maintained on SVA System 150), loyalty point information for the mileage or other loyalty program to which the traveler belongs (e.g., the current balance of loyalty points for the traveler as determined by SVA System 150 from a loyalty program system based on the name of the traveler and the airline on which the traveler is scheduled to fly), and the like, as well as various combinations thereof.

The manner in which SVA System 150 determines which business rules to evaluate, for a request message indicative that the encoded region of BP 120 has been read or accessed, may depend various combinations of such factors and/or various other factors.

The SVA System 150 evaluates each of the applicable business rules for determining, for each business rule, whether the associated conditions are satisfied and, thus, whether to apply the associated result of the business rule for the traveler.

A business rule may be evaluated using any suitable information.

In one embodiment, a business rule is evaluated using at least a portion of the information from the received request message indicative that the encoded region of BP 120 has been read or accessed (which, as described herein, at least includes BP information from the encoded region of the BP 120 and, optionally, may include additional information). For example, a business rule may be evaluated based on a name of the traveler, an airline on which the traveler is scheduled to fly, a flight number of a flight on which the traveler is scheduled to fly, an indication that the BP 120 is read by a particular barcode reader 130, an indication that the BP 120 is read at a particular location, and the like, as well as various combinations thereof.

In one embodiment, a business rule is evaluated using supplemental information that is obtained using at least a portion of the information from the received request message indicative that the encoded region of BP 120 has been read or accessed. The SVA System 150 may obtain the required supplemental information based on logic of the business rule and/or other logic of SVA System 150. For example, a business rule for rewarding a traveler for checking in early for his/her flight may require information indicative of how early the traveler must check in, as specified by the airline, in order to determine whether or not the traveler qualifies for the reward, which SVA System 150 may determine by querying, using the name of the airline received as part of the request message indicative that the encoded region of BP 120 has been read or accessed, a local database storing an indication of how early that airline requires travelers to check in for flights in order to receive a reward. For example, a business rule for rewarding a traveler when his/her flight is delayed requires information indicative of the current status of the flight on which the traveler is scheduled to fly, which SVA System 150 may determine by querying a flight status system using the name of the airline and the flight number received as part of the request message indicative that the encoded region of BP 120 has been read or accessed. For example, a business rule for enabling a traveler to pay for a meal in a restaurant using mileage or loyalty points from a frequent flyer loyalty program required information as to whether or not the traveler has enough points to cover the meal, which SVA System 150 may determine by querying a loyalty program system using the name of the traveler and the name of the airline on which the traveler is scheduled to fly. It will be appreciated that the foregoing examples are merely a few examples of the many types of business rules for which supplemental information may be obtained by SVA System 150.

In one embodiment, a business rule may be evaluated using various combinations of such information (e.g., using a combination of information from the received request message and supplemental information determined based on the information from the received request message).

The SVA System 150 may evaluate business rules in any suitable manner. The manner in which the business rules described herein may be evaluated will be understood based at least on the descriptions provided herein of the types of input information and output results associated with different types of business rules which may be supported, the various embodiments of different types of business rules which may be supported as described herein, the various examples of different types of business rules which may be supported as described herein, and the like, as well as various combinations thereof.

The SVA System 150, upon identifying a business rule to be applied for a traveler, determines one or more outputs or results of the business rule. The results of a business rule to be applied for a traveler may include any suitable results.

In one embodiment, for example, a business rule indicates that the traveler is entitled to remuneration. The remuneration may be provided in any suitable manner (e.g., crediting one or more accounts of the traveler, providing an indication of availability of remuneration for use by the traveler (e.g., via one or more messages provided from SVA System 130 to the device from which BP 120 is read and/or a device associated with the device from which BP is read), and the like, as well as various combinations thereof. The remuneration may be any suitable type of remuneration (e.g., one or more of money, a voucher, a coupon, a discount, an offer, loyalty points, and the like).

In one embodiment, for example, a business rule indicates an account of the traveler is be debited. For example, the results of a business rule to be applied for a traveler may include debiting the traveler in some manner (e.g., debiting money from an account of the traveler, debiting loyalty points from a loyalty account of the traveler, and the like).

The results of a business rule to be applied for a traveler may include any other suitable results as will be understood by way of reference to the various embodiments and examples of business rules described herein.

The SVA System 150, upon identifying a business rule to be applied for a traveler and determining the associated result(s) of the business rule, initiates one or more actions to provide the result(s) specified by the business rule. The actions may include any suitable actions.

In one embodiment, SVA System 150 initiates a response message indicative of one or more results specified by the business rule.

In one embodiment, the response message initiated by SVA System 150 is configured for enabling the result(s) to be presented at or near a device associated with reading of the encoded region of BP 120 of the traveler. For example, the result(s) may be presented via a display interface of the barcode reader 130 via which the encoded region of BP 120 was read, via a system or device associated with the barcode reader 130 via which the encoded region of BP 120 was read (e.g., via a check-in system 112, an information kiosk 114, a point-of-sale terminal of a business 116, a kiosks of an airline club 118, and the like), a display of the smartphone of the traveler where the BP 120 is stored within the smartphone, and the like. In one embodiment, the result(s) may be displayed to the traveler (e.g., via a display interface of the barcode reader 130, via a display of the smartphone of the traveler, via a kiosk being used by the traveler, and the like). In one embodiment, the result(s) may be displayed to a person associated with the transaction that triggers the message to be sent from the barcode reader 130 to the SVA System 150 (e.g., to an airline attendant operating check-in system 112 where the barcode reader 130 is associated with the airline system 112, to a cashier operating a point-of-sale terminal in a business 130 in which the BP 120 is read, and the like). It will be appreciated that various combinations of such embodiments may be used. The displayed information may include any type of results (e.g., a message indicating that the traveler is entitled to a buy-one-get-one-free offer, a message indicating that the traveler is entitled to a free drink with purchase of a meal, a message indicating that the traveler is entitled to a 10% discount, a message indicating that an account of the traveler was credited or debited, a message indicating that credits were deducted from an account of the traveler to pay for a purchase, and the like). The displayed information may be reviewed by the traveler and accepted by the traveler manually (e.g. via any suitable interface), reviewed by the traveler and applied manually by a person associated with the transaction either in response to reviewing the message or in response to an instruction from the traveler, reviewed by a person associated with the transaction and read to the traveler such that the traveler may then instruct the person as to whether or not to apply the results, and the like, as well as various combinations thereof. In embodiments in which a person associated with the transaction is involved, the person associated with the transaction may review the results information in any suitable manner (e.g., on a display of the barcode reader 130, on a display on a system or device with which the barcode reader 130 is associated, and the like) and, similarly, may apply the results information is any suitable manner (e.g., via a user control interface of the barcode reader 130, via a user control interface of a display on a system or device with which the barcode reader 130 is associated, and the like).

It will be appreciated that such embodiments enable the use of BP 120 to be extended based on business rules as described herein without requiring any real-time terminal-based and/or back-office integration between SVA System 150 and systems of businesses 116, airline club 118, and the like (e.g., the traveler and/or the person involved in the transaction of the traveler can merely manually adjust the required aspect of the transaction in order to execute the policies specific by the business rules).

It will be appreciated that such embodiments may further include one or more associated reconciliation processes which may be followed in order to maintain the integrity of SVA System 150 and, more generally, the extension of the use of BP 120 as described herein. In one embodiment, for example, the SVA System 150 may generate reports including details of transactions resulting from business rules of SVA System 150, such that the generated reports may be compared against reports from the systems at which results of the business rules are manually applied (e.g., reports of cash registers of the businesses 116 and/or any other systems) in order to ensure that the people involved in manually applying results of business rules are properly applying the results of the business rules.

In one embodiment, the response message initiated by SVA System 150 is configured for enabling a device associated with the reading of the encoded region of BP 120 of the traveler to automatically implement the result(s). For example, where the encoded region of the BP 120 is read by a barcode reader 130 associated with an information kiosk 114, the response message may automatically trigger the information kiosk 114 to print a voucher for a free coffee which may be redeemed at any café in the airport. For example, where the encoded region of the BP 120 is read by a barcode reader 130 associated with a point-of-sale terminal of a business 116, the response message may automatically trigger the point-of-sale terminal to apply the result (e.g., to automatically apply a 10% discount to the bill where the traveler is entitled to a 10% discount, to apply a buy-one-get-one-free offer where the traveler Is entitled to such an offer, and the like). For example, where the BP 120 is stored within a smartphone of the traveler and the smartphone initiates the message which triggers identification and application of the business rule, the response message may include electronic coupons, electronic vouchers, and the like which may be presented by the traveler at businesses 116 using his/her smartphone.

In one embodiment, SVA System 150 performs processing locally on SVA System 150 for providing one or more results specified by the business rule. In one such embodiment, for example, SVA System 150 may credit or debit a stored value account of the traveler that is maintained by SVA System 150. For example, the SVA System 150 may credit the stored value account of the traveler by associating one or more of money, points, electronic coupons, electronic vouchers, discounts, and the like to the stored value account of the traveler that is maintained by SVA System 150. For example, the SVA System 150 may debit the stored value account of the traveler by redeeming one or more of money, points, electronic coupons, electronic vouchers, discounts, and the like from the stored value account of the traveler that is maintained by SVA System 150. The SVA System 150 may perform various other types of local processing for providing one or more results specified by the business rule.

In one embodiment, SVA System 150 initiates one or more messages to one or more other systems (e.g., other systems 160) for providing one or more results specified by the business rule. For example, SVA System 150 may interact with a loyalty program system for crediting a loyalty account of the traveler (e.g., with loyalty points for use in the future) or debiting a loyalty account of the traveler (e.g., for enabling the traveler to pay using loyalty points, for enabling the traveler to trade loyalty points for other benefits, and the like, as well as various combinations thereof). For example, SVA System 150 may interact with other systems maintaining accounts which may be credited and debited for the traveler. The SVA System 150 may interact with various other types of systems for providing one or more results specified by the business rule.

It will be appreciated that various combinations of such actions may be performed by SVA System 150, depending on the business rule being applied for the traveler.

The many types of business rules which may be identified, evaluated, and applied, and the manner in which such business rules may be identified, evaluated, and applied, may be better understood by way of reference to the descriptions of exemplary use cases, which follow. Although these exemplary use cases are primarily described within the context of embodiments in which the encoded region of the BP is a 2D barcode read by a barcode reader, it will be appreciated that these use cases also may be adapted for use within any suitable means of encoding information on boarding passes and, similarly, any other suitable means of reading or accessing the information encoded on boarding passes.

In one embodiment, for example, one or more business rules of the SVA System 150 may be used for rewarding a traveler for frequent visits to the airport. The traveler may be rewarded in any suitable manner, e.g., using airport sponsored discounts, coupons, offers, and the like. In one such embodiment, for example, the SVA System 150 maintains a history of transactions for the traveler, thereby enabling the SVA System 150 to track the number of times the traveler visits the airport during a given period of time. The business rule of the SVA System 150 may then reward the traveler based on the number of times the traveler visited the airport during a given period of time. For example, a traveler that visits the same airport three times within a three month period may be remunerated with a discount to some or all of the businesses located at the airport. For example, a traveler that visits the same airport ten times within a rolling one year period may receive coupons for some or all of the business located at the airport. In such embodiments, the airport and the business owners may potentially share the cost of providing the benefits, or the cost of providing the benefits may be handled in other ways.

In one embodiment, for example, one or more business rules of the SVA System 150 may be used for rewarding a traveler for using a particular airline and/or for having a particular status with the airline. The traveler may be rewarded in any suitable manner, e.g., using airline sponsored discounts, coupons, offers, and the like. For example, a business rule may use the airline name of the airline used by the traveler and/or the VIP status of the traveler to suitably provide discounts, coupons, and offers for one or more businesses within the airport. For example, a business rule may indicate that a traveler flying on a particular airline, as indicated by information included within the encoded region of the BP of the traveler, may receive 10% off purchases in any business within the airport, receives coupons for particular stores within the airport, and the like. For example, a business rule may indicate that a traveler with elite status, as indicated by information included within the encoded region of the BP of the traveler or via other means, receives 10% off purchases in a particular restaurant, receives buy-one-get-one-free offers from another restaurant, receives one free coffee at any café, and the like. For example, Platinum members on Airline Company 1 may receive a buy-one-get-one-free offer at a Dunkin Donuts, whereas Gold members on Airline Company 2 may receive the same offer or a different offer at the same business or a different business. In such embodiments, the airlines and the business owners may potentially share the cost of providing the benefits, or the cost of providing the benefits may be handled in other ways.

In one embodiment, for example, one or more business rules of the SVA System 150 may be used for remunerating a traveler experiencing a problem with his/her flight, e.g., a flight delay or cancellation. In one such embodiment, upon receiving a request message indicative that the 2D barcode of the BP of a traveler has been read, the SVA System 150 determines the flight number of the flight on which the traveler is scheduled to travel, and then checks the current flight status of the flight. The SVA System 150 may check the flight status in any suitable manner. In one embodiment, for example, the SVA System 150 may determine the flight status of the traveler from stored value account of the traveler that is maintained in the SVA System (e.g., such as where one or more flight status systems at the airport are integrated with the SVA System and configured to provide flight status information to the SVA System periodically or in response to events such as delays and cancellations). In one embodiment, for example, the SVA System 150 may determine the flight status of the traveler by querying one or more flight status systems for the flight status of the flight. The flight status may be determined in any other suitable manner. The traveler may be remunerated in any suitable manner, e.g., using airline sponsored discounts, coupons, offers, and the like. For example, a business rule may indicate that a traveler scheduled on a delayed flight may receive a free coffee at any cafe in the airport, may receive a discounted meal at certain restaurants in the airport, and the like. For example, a business rule may indicate that a traveler scheduled on a flight that has been cancelled may receive a free meal at any restaurant in the airport, may receive a discounted meal at certain restaurants in the airport, and the like. In such embodiments, the airlines and the business owners may potentially share the cost of providing the benefits, or the cost of providing the benefits may be handled in other ways.

In one embodiment, for example, one or more business rules of the SVA System 150 may be used for providing a traveler with incentives for using the web for various travel-related activities (e.g., making reservations, printing BPs, providing an email address and registering to receive travel information and advertisements via the provided email address, and the like, as well as various combinations thereof). For example, a business rule may use web usage information associated with the traveler to suitably provide discounts, coupons, and offers for one or more businesses within the airport. In one such embodiment, upon receiving a request message indicative that the 2D barcode of the BP of a traveler has been read, the SVA System 150 determines web usage information associated with the traveler. The SVA System 150 may determine web usage information for the traveler in any suitable manner. In one embodiment, for example, the SVA System 150 may determine the web usage information from stored value account of the traveler that is maintained in the SVA System. In one embodiment, for example, the SVA System 150 may determine the web usage information of the traveler by querying one or more airline systems for the web usage information (e.g., querying a system of an airline based on airline identification information received as part of the request message indicative that the 2D barcode of the BP of a traveler has been read). The web usage information of the traveler may be determined in any other suitable manner. The traveler may be remunerated in any suitable manner, e.g., using airport and/or airline sponsored discounts, coupons, offers, and the like. For example, a business rule may indicate that a traveler that made the reservation and printed his/her BP via the web may receive a free coffee at any cafe in the airport, may receive discounts at certain stored in the airport, and the like. For example, a business rule may indicate that a traveler that is registered to receive travel information and advertisements via his/her email address may receive a buy-one-get-one-free offer at certain businesses, may be credited with additional loyalty points for purchases made within businesses of the airport, and the like. In such embodiments, the airport, airlines, and the business owners may potentially share the cost of providing the benefits, or the cost of providing the benefits may be handled in other ways.

In one embodiment, for example, one or more business rules of the SVA System 150 may be used for providing a traveler with incentives for using kiosks in the airport (e.g., check-in kiosks, information kiosks, and the like). In one such embodiment, kiosk-based incentives may be based on the traveler providing some additional information via the kiosk (e.g., an email, a telephone number, and the like). For example, a traveler might first interact with a kiosk, scan his/her BP, and then provide additional information when prompted. In this example, upon receiving a request message indicative that the 2D barcode of the BP of the traveler has been read and, further, that the traveler has provided additional information, the SVA System 150 may then provide some remuneration to the traveler. The traveler may be remunerated in any suitable manner, e.g., using airport and/or airline sponsored discounts, coupons, offers, and the like. For example, a business rule may indicate that a traveler that provided an email address may receive a free coffee at a particular cafe in the airport, may receive discounts at certain stores in the airport, and the like. For example, a business rule may indicate that a traveler that provided both an email address and a phone number may receive a 10% discount at any store in the airport, may be credited with additional loyalty points, and the like. In such embodiments, the airport, airlines, and the business owners may potentially share the cost of providing the benefits, or the cost of providing the benefits may be handled in other ways.

In one embodiment, for example, one or more business rules of the SVA System 150 may be used for providing a traveler with incentives related to flight check-in (e.g., based on check-in time, baggage weight, and the like, as well as combinations thereof). For example, upon checking in for a flight, information associated with the check-in process may be provided to the SVA System 150 for use in accessing and applying one or more business rules for the traveler.

In one such embodiment of check-in based incentives, for example, a business rule may indicate that a traveler that checks in more than a threshold amount of time before the scheduled departure time of the flight is entitled to receive some remuneration. In this embodiment, the determination as to whether the threshold is satisfied may be performed in any suitable manner (e.g., determining a difference between the check-in time and the flight time where both values are provided as part of a request message indicative that the 2D barcode of the BP of a traveler has been read, determining a difference between the check-in time and the flight time where the flight time is provided as part of a request message indicative that the 2D barcode of the BP of a traveler has been read and the check-in time is a current time on the SVA System (this also may require use of an identifier of a reader by which the BP is read, so that the SVA System can determine that the BP is being read as part of the check-in process and not some time later such as from a business or airline club), and the like). This will motivate at least some travelers to arrive early for their flights, which provides a significant benefit to airlines that are highly interested in accurately determining the number of travelers checked in for flights well in advance of departure time so that they can make adjustments to their seat assignments and logistics.

In one such embodiment of check-in based incentives, for example, a business rule may indicate that a traveler that checks baggage having a weight that is less than a threshold is entitled to receive some remuneration. In this embodiment, the determination as to whether the threshold is satisfied may be performed in any suitable manner (e.g., comparing the weight of the baggage to the threshold where the weight of the baggage is provided as part of a request message indicative that the 2D barcode of the BP of a traveler has been read, receiving an indication that the threshold is satisfied as part of a request message indicative that the 2D barcode of the BP of a traveler has been read, and the like). This will motivate at least some travelers to reduce the weight of the baggage that they bring on the flights, which provides a benefit to airlines that are highly interested in reducing the weight of the aircraft due to the cost of fuel.

In such embodiments, it will be appreciated that multiple thresholds may be used and the amount of remuneration applied for the traveler will vary depending on the threshold that is satisfied (e.g., the earlier the traveler checks in, the more remuneration he or she receives; the lower the baggage weight, the more remuneration he or she receives; and the like).

In such embodiments, it will be appreciated that such remuneration may be applied at the time of check-in and/or after check-in (e.g., where the check-in information of the traveler is encoded within the encoded region of the BP of the traveler).

In such embodiments, the traveler may be provided with any suitable form of remuneration, e.g., using airport and/or airline sponsored discounts, coupons, offers, and the like.

In such embodiments, the airport and airlines may potentially share the cost of providing the benefits, or the cost of providing the benefits may be handled in other ways.

In one embodiment, for example, one or more business rules of the SVA System 150 may be used for providing a traveler with incentives based on business-to-business collateral incentives. For example, two businesses within the airport (e.g., a store and a café) may enter into a joint marketing relationship whereby a traveler that makes a purchase at one business will receive some credit at the other business. For example, a traveler may make a purchase at a café, at which time the BP of the traveler is scanned and the SVA System 150 is informed of the purchase (possibly providing some credit for use at the café, e.g., based on one or more other business rules described herein). In continuation of this example, the same traveler may then make a purchase at a store having a joint agreement with the café, at which time the BP of the traveler is again scanned, SVA System 150 is informed of the purchase, the SVA System 150 detects that the business rule for the joint agreement should be applied, and the traveler is provided with some form of remuneration for use at the store based on the joint agreement (e.g., a buy-one-get-one-free offer which is communicated to the traveler, a 10% discount, and the like). In such embodiments, the business owners of the joint agreement may potentially share the cost of providing the benefits, or the cost of providing the benefits may be handled in other ways.

In one embodiment, for example, one or more business rules of the SVA System 150 may be used for providing a traveler with incentives based on membership in an airline club. For example, an airline club having small facilities may offer credits to airline club members that visit businesses within the airport rather than visiting the airline club, so as to prevent overcrowding of the airline club facility. For example, an airline club may reduce its food and beverage offerings in favor of providing credits to airline clubs members that incentivize the airline club members to visit the businesses within the airport rather than visiting the airline club, thereby enabling the airline club to reduce its costs. In such embodiments, upon receiving a request message indicative that the 2D barcode of the BP of a traveler has been read, the SVA System 150 determines whether or not the traveler is associated with an airline club (e.g., based on one or more of information included within the message, information stored in the SVA System, and information stored in one or more other systems in communication with the SVA System (e.g., airline VIP traveler tracking systems)), and applies the appropriate credit where the traveler is determined to belong to an airline club offering such incentives. The traveler may be remunerated in any suitable manner, e.g., using airline and/or airline club sponsored discounts, coupons, offers, and the like. For example, a business rule may indicate that a traveler that belongs to an airline club may receive a free coffee at any cafe in the airport, may receive discounts at any restaurants in the airport, and the like (since the traveler will be more likely to spend time in the restaurants than in the airline club). For example, a business rule may indicate that a traveler that belongs to an airline club may receive a discount at certain businesses of the airport, may be remunerated with additional loyalty points for purchases made within businesses of the airport, and the like. In such embodiments, the airport, airlines, and the business owners may potentially share the cost of providing the benefits, or the cost of providing the benefits may be handled in other ways.

In one embodiment, for example, one or more business rules of the SVA System 150 may be used for providing a traveler with loyalty point exchange capabilities.

In one such embodiment, for example, one or more business rules of the SVA System 150 may be used for providing a traveler with a capability to use loyalty points as currency within the airport. For example, a traveler who is making a purchase at a business of the airport might be provided with an option to pay for some or all of the purchase using his/her loyalty points. For example, upon receiving a request message indicative that the 2D barcode of the BP of a traveler has been read, the SVA System may determine an airline on which the traveler is scheduled to fly (e.g., via information included in the message, using information included in the message to determine the airline, and the like) and the business in which the 2D barcode of the BP of a traveler was read, and then provide the traveler with one or more associated options for using loyalty points as currency (e.g., an option to purchase a coffee for five loyalty points, an option to receive a 10% discount in exchange for twenty loyalty points, and the like). For example, Airline Company 1 may provide a traveler with an option to purchase a coffee from a café for five loyalty points. For example, Airline Company 2 may provide a traveler with an option to receive a 10% discount at any store in an airport in exchange for twenty loyalty points.

In one such embodiment, for example, one or more business rules of the SVA System 150 may be used for providing a capability for crediting a traveler with loyalty points. For example, upon receiving a request message indicative that the 2D barcode of the BP of a traveler has been read, the SVA System 150 may determine an airline on which the traveler is scheduled to fly and the business in which the 2D barcode of the BP of a traveler was read, and then determine whether or not the traveler is entitled to receive crediting of loyalty points based on the determined combination of information. For example, a traveler may be credited with loyalty points, of the airline on which the traveler is scheduled, in response to purchases made in certain businesses of the airport (e.g., one point for each dollar spent in a store, five points for each dollar spent in a restaurant, and the like). For example, a traveler may be credited with loyalty points based on travel-related information associated with the traveler (e.g., if the traveler checks in for the flight more than a threshold length of time before the flight is scheduled to depart, if the traveler checks in which baggage having a combined weight less than a threshold, and the like).

In at least some such embodiments, since loyalty points typically are controlled on a per-airline basis, use of loyalty points and/or crediting of loyalty points may be based at least in part on the airline on which the traveler is scheduled to fly. It will be appreciated that the use and/or crediting of loyalty points also may be based on other factors, such as the locations of the readers via which the BPs of the travelers are read in order to trigger use of loyalty points or crediting of loyalty points, the airline status of the travelers (e.g., whether or not they have elite status), and the like, as well as various combinations thereof.

In such embodiments, the loyalty points may be any suitable types of loyalty points, such as miles, reward points, and the like.

In such embodiments, the loyalty points may be managed in any suitable manner. In one embodiment, for example, the loyalty points may be loyalty points managed from the stored value account of the traveler on the SVA System 150. In one embodiment, for example, the loyalty points may be loyalty points managed from one or more other systems, in which case the SVA System 150 may interact with the other systems.

In such embodiments, the airlines and the business owners may potentially share the cost of providing the benefits, or the cost of providing the benefits may be handled in other ways.

In one embodiment, for example, one or more business rules of the SVA System 150 may be used for providing a traveler with incentives for using his/her smartphone to facilitate travel (e.g., by storing the BP as a paperless BP rather than using a paper-based boarding pass, by using particular travel-related applications provided by the airlines or others, and the like). In one embodiment, in which a traveler is rewarded for storing his/her BP on a smartphone, the encoded region of the BP may have encoded therein information that identifies the BP as being a smartphone-based BP rather than a BP. In this embodiment, the information that identifies the BP as being a smartphone-based BP is provided to the SVA System 150 as part of the encoded information when the encoded region of the BP is read or by other means, such that the SVA System 150 may access and apply one or more business rules based on use of the smartphone-based BP. In one embodiment, in which a traveler is rewarded for storing his/her BP on a smartphone and using a particular application to store and use the BP, the encoded region of the BP may have encoded therein information that identifies the BP as being a smartphone-based BP and, further, identifying the application being used. In this embodiment, the information that identifies the BP as being a smartphone-based BP being managed using the particular application is provided to the SVA System 150 as part of the encoded information when the encoded region of the BP 120 is read, such that the SVA System may access and apply one or more business rules based on use of the smartphone-based BP and the particular application. For example, the airport may reward a traveler for using a smartphone-based BP by providing the traveler with a 10% discount that may redeemed in any business within the airport, a free coffee from a café, and the like. For example, Airline Company 1 may provide a specific application for managing BPs for Airline Company 1's flights, and a traveler may be rewarded for using their BP application (e.g., via a buy-one-get-one-free coupon, via crediting of miles for use for Airline Company 1's flights, and the like). In such embodiments, the airlines and the business owners may potentially share the cost of providing the benefits, or the cost of providing the benefits may be handled in other ways.

From the foregoing embodiments and associated examples, it will be appreciated that the various business rules of the SVA System 150 may be configured and managed based on various existing partnerships, alliances, and relationships within the ecosystem of the airport and, further, may be configured and managed based on, as well as promote, new types of partnerships, alliances, and relationships. It also will be appreciated that the foregoing embodiments and associated examples are merely a few of the many business rules that may be utilized. As will be understood by those skilled in the art of loyalty programs, reward programs, e-currency programs, stored value accounts, and related areas, the foregoing embodiments and associated examples of business rules, and many other variations, extensions, and possibilities of such embodiments and associated examples of business rules, may be applied to the capability depicted and described herein for extending the usage of boarding passes within airports.

From the foregoing embodiments and associated examples, it will be appreciated that the capability depicted and described herein provides various benefits for all interested parties, including but not limited to the airports, airlines, businesses located within airports, airline clubs, travelers, and the like.

As described herein with respect to FIG. 1, extension of the use of BPs involves interaction between various elements. A method according to one embodiment for using a BP of a traveler to apply one or more business rules for the traveler is depicted and described with respect to FIG. 2.

Figure 2:
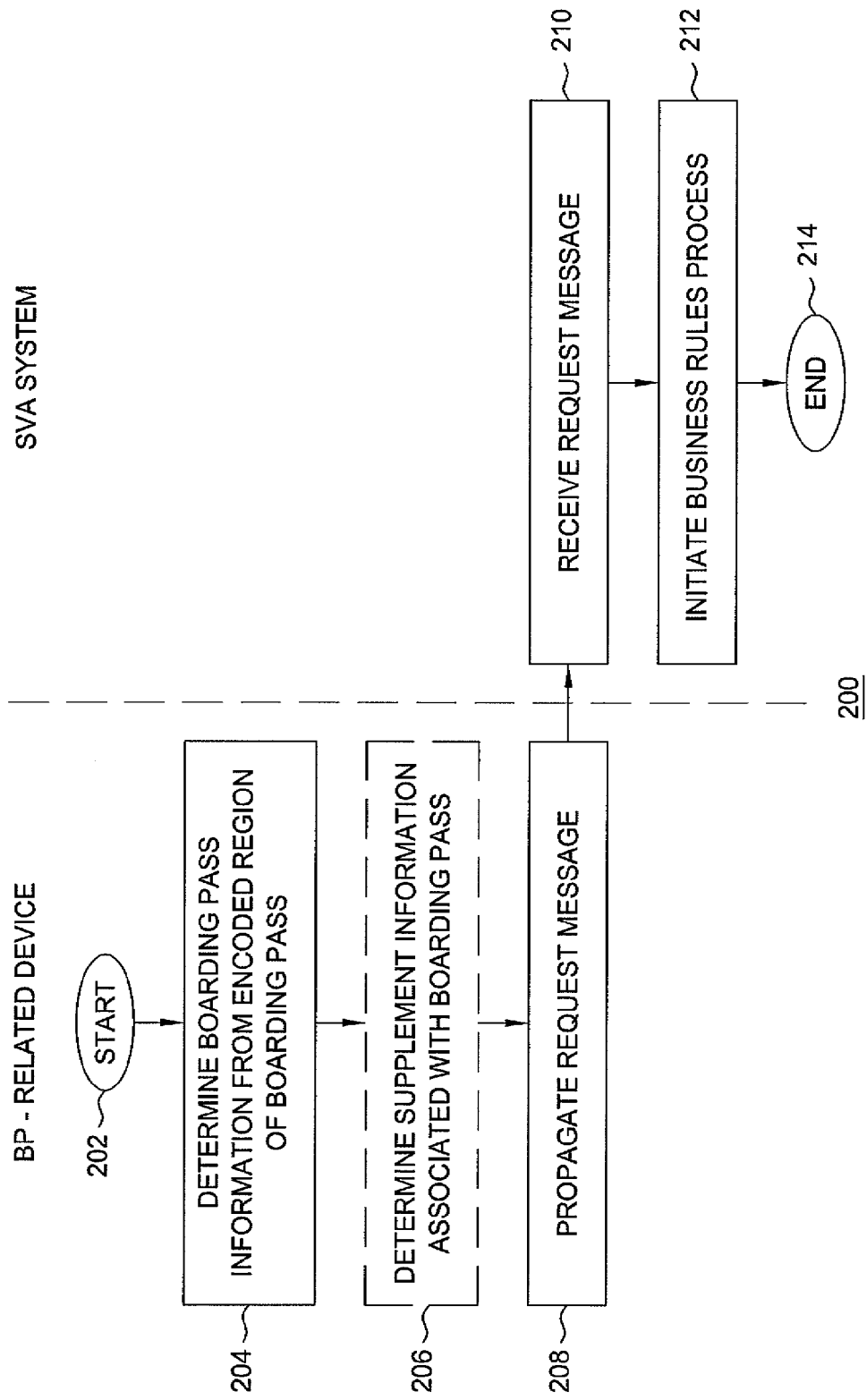
FIG. 2 depicts one embodiment of a method for using a boarding pass of a traveler to apply one or more business rules for the traveler.

FIG. 2 depicts one embodiment of a method for using a boarding pass of a traveler to apply one or more business rules for the traveler.

As depicted in FIG. 2, a portion of the steps of method 200 are performed by a BP-related device (e.g., a barcode reader, a barcode reader and/or a device associated with the barcode reader, a smartphone of the traveler, and the like), and a portion of the steps are performed by the SVA System.

At step 202, method 200 begins.

At step 204, a BP-related device determines BP information from the encoded region of the BP of the traveler. For example, a barcode reader may determine the BP information by reading the encoded region of the BR For example, a device associated with a barcode reader (e.g., kiosks, point-of-sale terminal, and the like) may determine the BP information by receiving it from the barcode reader. For example, a smartphone of the traveler may determine the BP information from the BP which is electronically stored on the smartphone. As described herein, the BP information may be determined in other ways.

At step 206 (an optional step), a BP related device determines supplemental information associated with the BP (e.g., an identifier of the barcode reader used to read the encoded region of the BP, an identifier of a device associated with a barcode reader used to read the encoded region of the BP, an identifier of a location in which the encoded region of the BP is read, information that is associated with the transaction for which the encoded region of the BP is read, and the like, as well as various combinations thereof).

At step 208, a BP-related device propagates a request message toward the SVA System, for triggering the SVA System to determine whether or not to apply business rules for the traveler. The request message includes the BP information from the encoded region of the BP and, optionally, the supplemental information. The request message may be propagated from the BP-related device to the SVA System in any suitable manner, e.g., from a barcode reader directly, from a barcode reader via a device associated with the barcode reader, from a smartphone, and the like.

At step 210, the SVA System receives the request message, thereby triggering the SVA System to initiate a business rules process for determining whether or not to apply business rules for the traveler.

At step 212, the SVA System initiates a business rules process for determining whether or not to apply business rules for the traveler. The business rules process may be any suitable process for determining whether or not to apply business rules for the traveler in response to the request message. A business rules process according to one embodiment is depicted and described with respect to FIG. 3.

At step 214, method 200 ends.

Although depicted and described as ending (for purposes of clarity), it will be appreciated that the SVA System continues to perform the processing associated with executing the business rules process of step 212.

The operation of method 200 may be better understood by way of reference to the description of FIG. 1.

Figure 3:
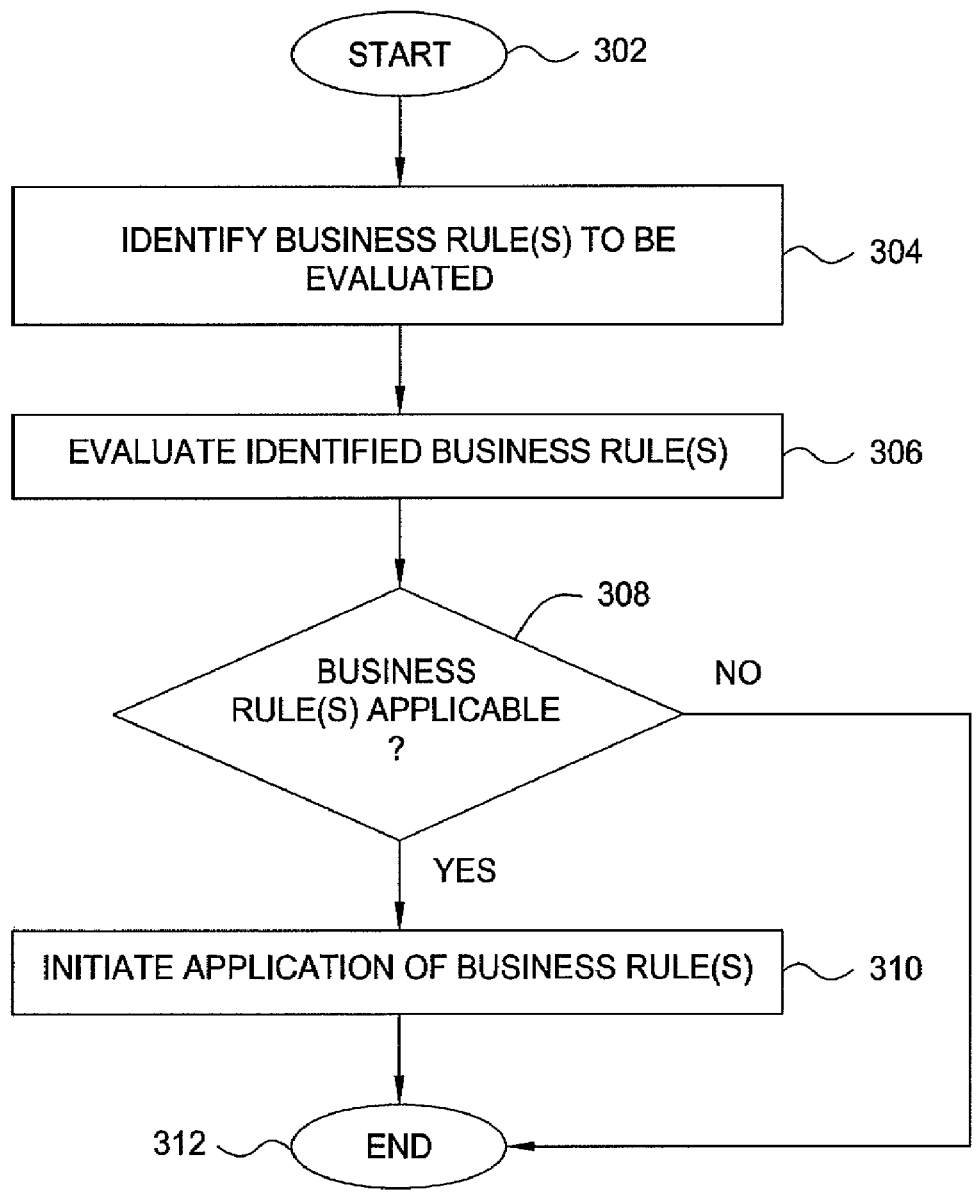
FIG. 3 depicts one embodiment of a method for performing a business rules process based on a boarding pass of a traveler in order to apply one or more business rules for the traveler.

FIG. 3 depicts one embodiment of a method for performing a business rules process based on a boarding pass of a traveler in order to apply one or more business rules for the traveler.

The method 300 of FIG. 3 is performed by the SVA System in response to receiving a request message configured for triggering the SVA System to determine whether or not to apply business rules for the traveler.

The method 300 of FIG. 3 is suitable for use as step 212 of method 200 of FIG. 2.

At step 302, method 300 begins.

At step 304, the SVA System identifies one or more business rules to be evaluated for the traveler based on the received request message.

At step 306, the SVA System evaluates one or more of the identified business rules in for determining whether or not the identified business rules are applicable for the traveler.

At step 308, the SVA System determines, for each evaluated business rule, whether or not the evaluated business rule is satisfied, such that the SVA System determines which, if any, of the evaluated business rules should be applied for the traveler. If none of the evaluated business rules is to be applied for the traveler, method 300 proceeds to step 312, where method 300 ends. If at least one of the evaluated business rules is to be applied for the traveler, method 300 proceeds to step 310.

At step 310, the SVA System initiates application of the business rule(s) for the traveler. A business rule may have one or more results associated therewith, and the SVA System may initiate application of the business rule based on the specified result(s). As described herein, the SVA System may initiate application of a business rule in any suitable manner (e.g., propagating a response message to the barcode reader or device associated with the barcode reader, crediting or debiting an account of the traveler maintained on the SVA System, interacting with one or more other systems, and the like, as well as various combinations thereof).

At step 312, method 300 ends.

Although depicted and described as ending (for purposes of clarity), it will be appreciated that the SVA System continues to perform the processing at least for evaluating additional request messages received for evaluation.

The operation of method 300 may be better understood by way of reference to the description of FIG. 1.

Figure 4:
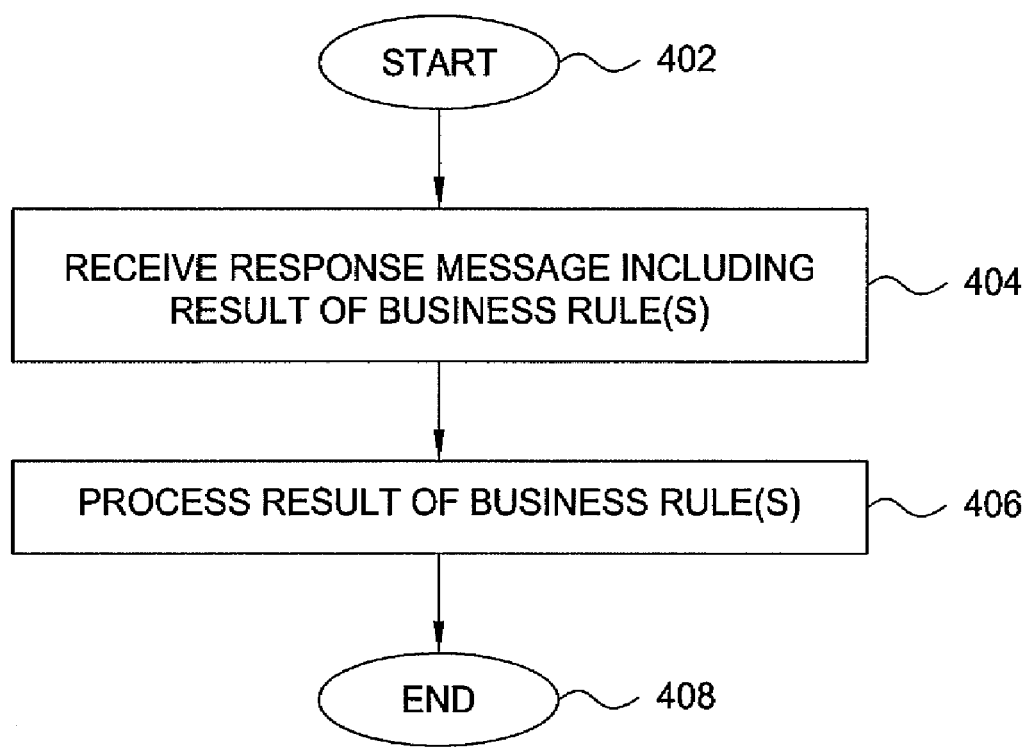
FIG. 4 depicts one embodiment of a method for handling application of a business rule for a traveler.

FIG. 4 depicts one embodiment of a method for handling application of a business rule for a traveler.

The method 400 of FIG. 4 may be performed by any device which may handle application of a business rule for a traveler. For example, method 400 of FIG. 4 may be performed by a device which initiated a request message for triggering application of the business rule for the traveler (e.g., a barcode reader, a barcode reader and/or a device associated with the barcode reader, a smartphone of the traveler, and the like), the SVA System, one or more other systems that interact with the SVA System (e.g., loyalty program systems, inventory and/or cashier systems of businesses, and the like), and the like.

At step 402, method 400 begins.

At step 404, the device receives a response message including one or more result(s) specified by one or more business rules to be applied for the traveler.

At step 406, the device processes the results of the business rules. As will be understood, the type of processing to be performed will depend on factors such as the type of device at which the response message is received, the type of results to be applied, and the like. For example, where the response message is received by a barcode reader, the barcode reader may display the results on a display interface of the barcode reader, pass the results to an associated device or system (e.g., a kiosk, point-of-sale terminal, and the like) for display and/or automatic application of the results, and the like, as well as various combinations thereof. For example, where the response message is received by a loyalty program system, the loyalty program system may process the response message for crediting or debiting an account of the traveler as specified by the response message. It will be appreciated that the foregoing examples are merely a few examples of the various ways in which such response messages may be processed by various devices involved in application of business rules for travelers via their BPs.

At step 408, method 400 ends.

The operation of method 400 may be better understood by way of reference to the description of FIG. 1.

Although primarily depicted and described herein with respect to embodiments in which the BP information is encoded on the BP using a 2D barcode, it will be appreciated that any other suitable type of encoding may be used to encode the BP information on the BP (e.g., using other types of barcodes, Radio Frequency Identifier (RFID) tags, magnetic stripes, and the like). In such embodiments, the barcode readers 130 depicted and described herein may be replaced with any other suitable types of devices suitable for use in accessing the BP information from the encoded region of the BP (e.g., other types of barcode readers, RFID tag readers, magnetic stripe readers, and the like).

Although primarily depicted and described with respect to specific types of e-currency being used as the basis for crediting and debiting of accounts of travelers, it will be appreciated that any other suitable types of e-currency may be used. Similarly, although primarily depicted and described with respect to specific types of remuneration being made available for use by travelers based on business rules, it will be appreciated that any other suitable types of remuneration may be made available for use by travelers based on business rules. Although primarily depicted and described with respect to remuneration being made available to travelers, crediting and debiting of accounts of travelers, and like results of business rules, it will be appreciated that business rules being applied for travelers may specify any other suitable types of results which may be associated with such inputs of such business rules associated with boarding passes of travelers.

Although primarily depicted and described herein with respect to embodiments in which the SVA System 150 is located within an airport and serves only that airport, it will be appreciated that other embodiments may be used.

In one embodiment, for example, a single SVA System may be used to serve multiple airports.

In one embodiment, for example, multiple SVA Systems may be used to serve multiple airports (e.g., where each SVA System serves a respective airport, where a single SVA System serves multiple airports, and the like, as well as various combinations thereof). In this embodiment, the multiple SVA Systems may be logically integrated such that, from the perspective of the travelers, a single SVA System is accessible from all of the airports served by the SVA Systems.

It will be appreciated that, in at least some such embodiments, the request messages received at the SVA System(s) may include additional identification information as appropriate. For example, where an SVA System serves multiple terminals of an airport, the request message may include an identifier of the terminal from which the BP information is received. For example, where an SVA System serves multiple airports, the request message may include an identifier of the airport (and, optionally, terminal, from which the BP information is received).

It will be appreciated that various other implementations may be used for supporting the functions of the SVA System 150 for the travelers.

In this manner, the capability for extending the use of BPs within airports may be used worldwide by the millions of travelers traveling through airports every day.

Although primarily depicted and described herein with respect to travelers departing from originating airports, it will be appreciated that other travelers within airports also may possess BPs. For example, travelers passing through a connecting airport to board a connecting flight also have valid BPs, which may be used within the connecting airport in the manner described herein for travelers departing from airports. Similarly, for example, many travelers arriving at a destination airport may still retain their original BPs, which may be used within the connecting airport in the manner described herein for travelers departing from airports.

Although primarily depicted and described herein within the context of a boarding pass of an airport, it will be appreciated that various embodiments depicted and described herein may be utilized with any suitable tickets and passes for any other suitable types of transportation (e.g., train stations, bus stations, and the like).

In one exemplary embodiment, the SVA System 150 depicted and described herein may be implemented using and/or used in conjunction with the Alcatel-Lucent Venture's Touchatag Mobile Wallet Services (MWS) System.

Figure 5:
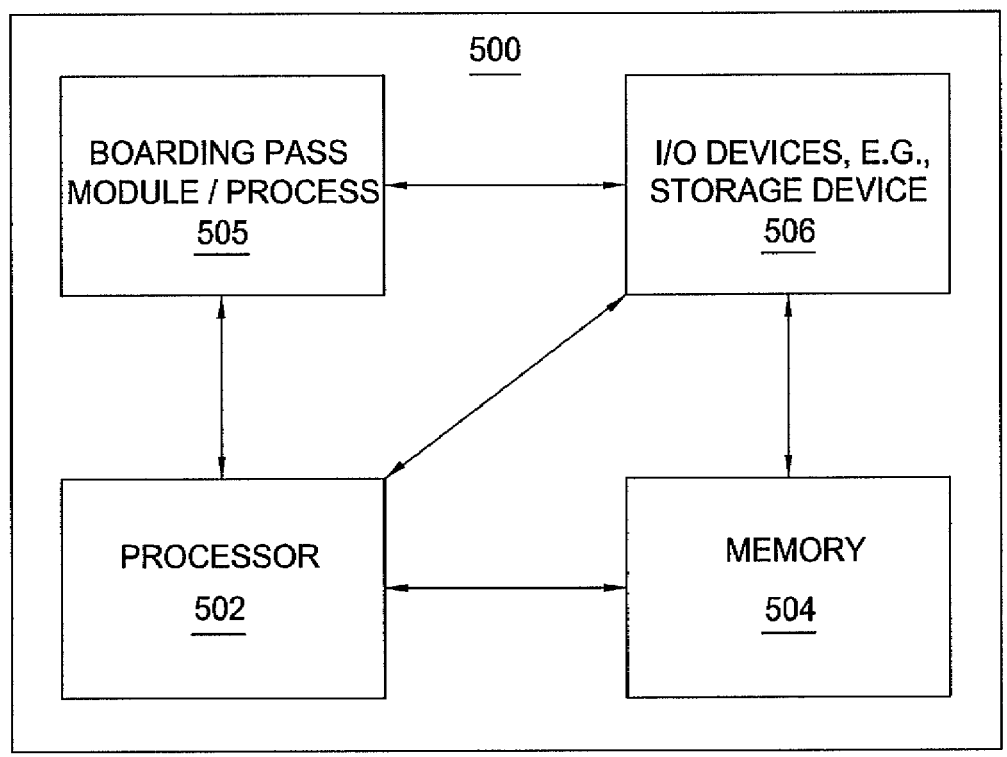
FIG. 5 depicts a high-level block diagram of a computer suitable for use in performing functions described herein.

FIG. 5 depicts a high-level block diagram of a computer suitable for use in performing functions described herein.

As depicted in FIG. 5, computer 500 includes a processor element 502 (e.g., a central processing unit (CPU) and/or other suitable processor(s)), a memory 504 (e.g., random access memory (RAM), read only memory (ROM), and the like), a boarding pass extension module/process 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or in a combination of software and hardware, e.g., using a general purpose computer, one or more application specific integrated circuits (ASIC), and/or any other hardware equivalents. In one embodiment, the boarding pass extension process 505 can be loaded into memory 504 and executed by processor 502 to implement the functions as discussed herein. Thus, boarding pass extension process 505 (including associated data structures) can be stored on a computer readable storage medium, e.g., RAM memory, magnetic or optical drive or diskette, and the like.

It will be appreciated that computer 500 depicted in FIG. 5 provides a general architecture and functionality suitable for implementing functional elements described herein or portions of the functional elements described herein. For example, the computer 500 provides a general architecture and functionality suitable for implementing one or more check-in systems 112, information kiosks 114, devices and systems associated with businesses 116, devices and systems associated with airline clubs 118, barcode readers 130, SVA System 150, one or more of the other systems 160, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method, comprising:
   using a processor for:
   receiving information accessed from an encoded region of a boarding pass of a traveler, wherein accessing of the information from the encoded region of the boarding pass is associated with a device; and
   determining a remuneration for the traveler based on at least one business rule, at least a portion of the information from the encoded region of the boarding pass, and at least one of information indicative of the device associated with accessing of the information from the encoded region of the boarding pass and information indicative of a device type of the device associated with accessing of the information from the encoded region of the boarding pass.

2. The method of claim 1, wherein the device is a barcode reader, a check-in system, a kiosk, a point-of-sale terminal, or a smartphone of the traveler.

3. The method of claim 1, wherein the encoded region of the boarding pass is a barcode.

4. The method of claim 1, wherein the information accessed from the encoded region of the boarding pass comprises at least one of a name of the traveler, a name of an airline on which the traveler is scheduled to fly, a flight number of a flight on which the traveler is scheduled to fly, or a flier status of the traveler.

5. The method of claim 1, further comprising:
   receiving supplemental information associated with the information accessed from the encoded region of the boarding pass; and
   determining the remuneration for the traveler based on the supplemental information.

6. The method of claim 5, wherein the supplemental information is received in conjunction with the information accessed from the encoded region of the boarding pass, or is received in response to a request initiated toward a system based on at least a portion of the information accessed from the encoded region of the boarding pass.

7. The method of claim 5, wherein the supplemental information comprises at least one of:
   information associated with a location associated with accessing of the encoded region of the boarding pass;
   travel-related information associated with a trip of the traveler; and
   transaction-related information associated with a transaction of the traveler.

8. The method of claim 7, wherein the information associated with a location associated with accessing of the encoded region of the boarding pass comprises at least one of:
   an indication of a type of location associated with accessing of the encoded region of the boarding pass; and
   an identifier of a location associated with accessing of the encoded region of the boarding pass.

9. The method of claim 7, wherein the travel-related information comprises at least one of a check-in time at which the traveler checks in for the trip and a baggage weight of baggage checked by the traveler.

10. The method of claim 7, wherein the transaction-related information comprises at least one of an indication of a type of transaction, a type of an item purchased in a transaction, a cost of an item purchased in a transaction, or a total cost of a transaction.

11. The method of claim 1, wherein the remuneration comprises a credit to an account of the traveler.

12. The method of claim 1, wherein an indication of the remuneration is propagated toward a device for use by the traveler.

13. The method of claim 1, wherein the remuneration comprises at least one of money, a voucher, a coupon, a discount, an offer, and loyalty points.

14. The method of claim 1, further comprising:
   propagating, toward the device, a message comprising an indication of the remuneration for the traveler.

15. The method of claim 1, wherein at least one of:
   the information comprises an airline status of the traveler, and the business rule indicates that the traveler is entitled be remunerated when the airline status of the traveler indicates that the traveler has elite status;
   the information comprises a name of the traveler, and the business rule indicates that the traveler is entitled to be remunerated based on a determination that the traveler has traveled via the airport a threshold number of times; or
   the information comprises an indication that the traveler belongs to an airline club, and the business rule indicates that the traveler is entitled to be remunerated based on a determination that the information is received from a device not associated with the airline club.

16. The method of claim 1, wherein the information comprises a name of an airline on which the traveler is scheduled to fly, and the business rule indicates that the traveler is entitled to be remunerated for using the airline.

17. The method of claim 1, wherein the information comprises a flight number of a flight on which the traveler is scheduled to fly, and the business rule indicates that the traveler is entitled to be remunerated based on a determination that the flight is delayed or cancelled.

18. The method of claim 1, wherein the information comprises a check-in time at which the traveler checks in for a flight, and the business rule indicates that the traveler is entitled to be remunerated based on a determination that the traveler checks in for the flight more than a threshold amount of time before a scheduled departure time of the flight.

19. The method of claim 1, wherein the information comprises a weight of baggage checked by the traveler, and the business rule indicates that the traveler is entitled to be remunerated based on a determination that the weight of baggage checked by the traveler is less than a threshold amount.

20. The method of claim 1, wherein at least one of:
the information comprises an indication that a flight was booked online or that the boarding pass was printed from an electronic ticket, and the business rule indicates that the traveler is entitled to be remunerated for booking the flight online or printing the boarding pass from an electronic ticket;
the information comprises an indication that the information is received from a kiosk, and the business rule indicates that the traveler is entitled to be remunerated for using the kiosk; or
the information comprises an indication that the information is received from a smartphone of the traveler, and the business rule indicates that the traveler is entitled to be remunerated for using the smartphone to maintain the boarding pass.

21. The method of claim 1, further comprising:
receiving supplemental information comprising an indication that the encoded region of the boarding pass is read at a first business;
wherein the business rule indicates that the traveler is entitled to be remunerated at the first business based on a determination that the traveler has conducted at least one transaction at a second business.

22. The method of claim 1, further comprising:
receiving supplemental information and determining the remuneration for the traveler based on the the supplemental information;
wherein at least one of:
the supplemental information comprises a name of an airline on which the traveler is scheduled to fly, and the business rule indicates that the traveler is entitled to be remunerated for using the airline;
the supplemental information comprises an airline status of the traveler, and the business rule indicates that the traveler is entitled be remunerated when the airline status of the traveler indicates that the traveler has elite status;
the supplemental information comprises a flight number of a flight on which the traveler is scheduled to fly, and the business rule indicates that the traveler is entitled to be remunerated based on a determination that the flight is delayed or cancelled;
the supplemental information comprises a check-in time at which the traveler checks in for the flight, and the business rule indicates that the traveler is entitled to be remunerated based on a determination that the traveler checks in for the flight more than a threshold amount of time before a scheduled departure time of the flight;
the supplemental information comprises a weight of baggage checked by the traveler, and the business rule indicates that the traveler is entitled to be remunerated based on a determination that the weight of baggage checked by the traveler is less than a threshold amount;
the supplemental information comprises a name of the traveler, and the business rule indicates that the traveler is entitled to be remunerated based on a determination that the traveler has traveled via the airport a threshold number of times;
the supplemental information comprises an indication that the flight was booked online or that the boarding pass was printed from an electronic ticket, and the business rule indicates that the traveler is entitled to be remunerated for booking the flight online or printing the boarding pass from an electronic ticket;
the supplemental information comprises an indication that the information is received from a kiosk, and the business rule indicates that the traveler is entitled to be remunerated for using the kiosk;
the supplemental information comprises an indication of a first business at which the encoded region of the boarding pass is read, and the business rule indicates that the traveler is entitled to be remunerated at the first business in response to a determination that the traveler has conducted at least one transaction at a second business;
the supplemental information comprises an indication that the traveler belongs to an airline club, and the business rule indicates that the traveler is entitled to be remunerated based on a determination that the information is received from a device not associated with the airline club; or the supplemental information comprises an indication that the information is received from a smartphone of the traveler, and the business rule indicates that the traveler is entitled to be remunerated for using the smartphone to maintain the boarding pass.

23. An apparatus, comprising:
a processor and a memory communicatively connected to the processor, the processor configured to:
receive information accessed from an encoded region of a boarding pass of a traveler, wherein accessing of the information from the encoded region of the boarding pass is associated with a device; and
determine a remuneration for the traveler based on at least one business rule, at least a portion of the information from the encoded region of the boarding pass, and at least one of information indicative of the device associated with accessing of the information from the encoded region of the boarding pass and information indicative of a device type of the device associated with accessing of the information from the encoded region of the boarding pass.

* * * * *